United States Patent
Zhong et al.

(10) Patent No.: US 9,322,462 B2
(45) Date of Patent: Apr. 26, 2016

(54) DEVICE FOR VEHICLE-MOUNTED EQUIPMENT AND VEHICLE HAVING THE SAME

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Yilin Zhong, Guangdong (CN); Junming Bai, Guangdong (CN); Jun Dai, Guangdong (CN); Lei Fang, Guangdong (CN); Jingjing Gao, Guangdong (CN)

(73) Assignees: BYD Company Limited, Shenzhen, Guangdong, P.R. (CN); Shenzhen BYD Auto R&D Company Limited, Shenzhen, Guangdong, P.R. (CN)

( * ) Notice: Subject to any disclaimer, the term of this patent is extended or adjusted under 35 U.S.C. 154(b) by 49 days.

(21) Appl. No.: 14/286,771

(22) Filed: May 23, 2014

(65) Prior Publication Data

US 2014/0338479 A1 Nov. 20, 2014

Related U.S. Application Data

(63) Continuation of application No. PCT/CN2012/085003, filed on Nov. 22, 2012.

(30) Foreign Application Priority Data

Nov. 25, 2011 (CN) .......................... 2011 1 0379949

(51) Int. Cl.
 *B60R 11/00* (2006.01)
 *F16H 21/40* (2006.01)
 *B60R 11/02* (2006.01)

(52) U.S. Cl.
 CPC ............... *F16H 21/40* (2013.01); *B60R 11/00* (2013.01); *B60R 11/0258* (2013.01);

(Continued)

(58) Field of Classification Search
 CPC .................. B60R 7/046; B60R 2011/0007
 USPC ......... 296/24.34, 37.8; 248/311.2; 297/188.15
 See application file for complete search history.

(56) References Cited

U.S. PATENT DOCUMENTS

| 2006/0108820 A1 | 5/2006 | Vican | |
| 2009/0146444 A1* | 6/2009 | Ichimaru | B60R 7/04 296/37.8 |

FOREIGN PATENT DOCUMENTS

| CN | 201694114 U | 1/2011 |
| CN | 101992713 A | 3/2011 |

(Continued)

OTHER PUBLICATIONS

PCT International Search Report and Written Opinion mailed Feb. 28, 2013, issued in International Application No. PCT/CN2012/085003 (14 pages).

(Continued)

*Primary Examiner* — Joseph D Pape (74) *Attorney, Agent, or Firm* — Finnegan, Henderson, Farabow, Garrett & Dunner, LLP (57) ABSTRACT

A device for moving one or more vehicle-mounted objects and a vehicle having the same are provided. The device comprises: a housing; a cover; at least one pivot for adjusting the cover, the at least one pivot disposed in the housing and comprises a first end and a second end, wherein the first end of the at least one pivot is coupled with the cover; and a box assembly disposed in the housing, the box assembly being movable between a first position away from the opening and a second position near the opening. The box assembly is coupled with the second end of the at least one pivot, wherein the cover exposes at least a part of the opening when the box assembly is at the second position, and wherein the cover covers at least a part of the opening when the box assembly is at the first position.

20 Claims, 4 Drawing Sheets

(52) U.S. Cl.
CPC *B60R 2011/0005* (2013.01); *B60R 2011/0082* (2013.01); *B60R 2011/0084* (2013.01); *B60R 2011/0092* (2013.01); *B60R 2011/0094* (2013.01); *Y10T 74/188* (2015.01)

(56) References Cited

FOREIGN PATENT DOCUMENTS

| | | |
|---|---|---|
| CN | 102085831 A | 6/2011 |
| CN | 202279055 U | 6/2012 |
| DE | 20005552 U1 | 6/2000 |
| DE | 100 08 887 A1 | 10/2001 |
| JP | H 8-9277 A | 1/1996 |
| JP | 2003-165389 A | 6/2003 |
| WO | WO 2013/075632 A1 | 5/2013 |

OTHER PUBLICATIONS

Extended European Search Report dated Jul. 7, 2015, issued in related European Patent Application No. EP 12852324.8 (8 pages).

* cited by examiner

ID-MOUNTED
EQUIPMENT AND VEHICLE HAVING THE
SAME

CROSS-REFERENCE TO RELATED APPLICATION

This application is a continuation application of International Application No. PCT/CN2012/085003, filed on Nov. 22, 2012, which claims priority and benefits of Chinese Patent Application No. 201110379949.3, filed with the State Intellectual Property Office of China (SIPO) on Nov. 25, 2011. The entire content of the above-referenced applications is incorporated herein by reference.

FIELD

The present disclosure generally relates to the field of lifting device, particularly, to a lifting device for vehicle-mounted equipment and a vehicle having such a lifting device.

BACKGROUND

Recently, more equipment is mounted inside a vehicle. Conventional vehicle-mounted equipment is mounted on the dashboard of the vehicle and extend out of the dashboard when they are in use, and retract into the dashboard when they are not in use. However, the opening through which the piece of equipment extends or retracts into the dashboard may allow articles, such as dust and water, to go into the dashboard. The opening can also affect the appearance integrality of the dashboard. Such an arrangement also affects the aesthetic of the interior of the vehicle, since the vehicle-mounted equipment cannot be inosculated with the interior of the vehicle. Therefore, there is a need for a device to lift or move the equipment to a position where the equipment can extend out of the dashboard when needed, and to bring the equipment to a position inside the dashboard when the equipment are not needed, and to cover the opening after the equipment retract into the dashboard.

SUMMARY

An object of embodiments of the present disclosure is to provide a device for vehicle-mounted equipment capable of moving the vehicle-mounted equipment to extend out of the dashboard when it is in use and to close the opening of the dashboard after the vehicle-mounted equipment is retracted into the dashboard when it is not in use.

Another object of embodiments of the present disclosure is to provide a vehicle having the equipment-moving device mentioned above.

According to an embodiment of the present disclosure, a device for moving one or more vehicle-mounted objects comprises: a housing with an opening; a cover; at least one pivot for adjusting the cover, the at least one pivot disposed in the housing and comprises a first end and a second end, wherein the first end is coupled with the cover; and a box assembly disposed in the housing and being movable between a first position away from the opening and a second position near the opening. The box assembly is coupled with the second end of the at least one pivot, wherein the cover exposes at least a part of the opening when the box assembly is at the second position, and wherein the cover covers at least a part of the opening when the box assembly is at the first position.

According to an embodiment of the present disclosure, the box assembly comprises: a box body; and a power unit and a transmission for driving the box body to move between the first position and the second position; and the housing comprises one or more toothed bars to mesh with the transmission. In some embodiments, the power unit comprises a motor and an output shaft coupled with a first gear, while the transmission comprises: a second gear to mesh with the first gear; a worm coaxial with the second gear; a third gear to mesh with the worm; and a fourth gear coaxial with the third gear and to mesh with the one or more toothed bars.

In some embodiments, at least one sidewall of the box body comprises a guiding structure, while the second end of at least one pivot is coupled with a guiding column structure, wherein the guiding column structure is capable of slidably fitting in the guiding structure, wherein the box assembly is configured to cause the at least one pivot to rotate via a motion of the guiding column structure within the guiding structure. In some embodiments, at least one sidewall of the housing comprises a rotating shaft to mount the at least one pivot on the housing. In some embodiments, the at least one pivot further comprises at least one rotating arm to be pivotably mounted on the rotating shaft, and the cover is coupled with a first end of the at least one rotating arm. In some embodiments, the at least one rotating arm comprises: a first mounting ring; a first rotating rod; and a second rotating rod, wherein the first and second rotating rods are coupled together at the first mounting ring and form an angle between them. In some embodiments, the angle ranges from about 100 degrees to about 150 degrees.

In some embodiments, a surface of the cover is coupled to one end of the first rotating rod of the at least one rotating arm away from the first mounting ring. In some embodiments, the guiding column structure comprises at least one sliding column disposed on one end of the second rotating rod of the at least one rotating arm away from the first mounting ring. In some embodiments, the guiding structure comprises at least one guiding groove, and wherein the at least one sliding column is capable of slidably fitting in the at least one guiding groove. In some embodiments, the at least one guiding groove comprises a first groove portion; and a second groove portion connected with and is perpendicular to the first groove portion.

In some embodiments, the housing of the device for moving one or more vehicle-mounted objects further comprises a position limit structure disposed on an edge of at least one sidewall of the housing, wherein the position limit structure comprises at least one position limit groove which starts from the edge of the sidewall and cuts through at least a part of the sidewall, wherein the at least one rotating arm is capable of slidably fitting within the at least one position limit groove; and at least one first position limit block disposed at one end of the at least one position limit groove.

According to another embodiment of the present disclosure, a vehicle comprises: a dashboard with an opening; and a device for moving one or more vehicle-mounted objects, comprising: a housing; a cover; at least one pivot for adjusting the cover, the at least one pivot disposed in the housing and comprises a first end and a second end, wherein the first end is coupled with the cover; and a box assembly disposed in the housing and being movable between a first position away from the opening and a second position near the opening. The box assembly is coupled with the second end of the at least one pivot, wherein the cover exposes at least a part of the opening when the box assembly is at the second position, and covers at least a part of the opening when the box assembly is at the first position.

In some embodiments of a vehicle according to the present disclosure, the cover forms a surface integral to the dashboard when the box assembly is at the first position.

In some embodiments of a vehicle according to the present disclosure, the box assembly comprises: a box body; and a power unit and transmission for driving the box body to move between the first position and the second position; and the housing comprises one or more toothed bars to mesh with the transmission.

In some embodiments of a vehicle according to the present disclosure, at least one sidewall of the box body comprises a guiding structure; and the second end of the at least one pivot is coupled with a guiding column structure, wherein the guiding column structure is capable of slidably fitting in the guiding structure, and wherein the box assembly is configured to cause the at least one pivot to rotate via a motion of the guiding column structure within the guiding structure.

According to another embodiment of the present disclosure, a vehicle comprises: a dashboard with an opening; and a device for moving one or more vehicle-mounted objects, comprising: a housing; a cover; at least one pivot for moving the cover, the at least one pivot disposed in the house and is configured to cause the cover to move; and a box assembly disposed in the housing being movable between a first position away from the opening and a second position near the opening. The box assembly is coupled with the at least one pivot, wherein the cover exposes at least a part of the opening when the box assembly is at the second position, and covers at least a part of the opening when the box assembly is at the first position.

In some embodiments of a vehicle according to the present disclosure, the cover forms a surface integral to the dashboard when the box assembly is at the first position.

In some embodiments of a vehicle according to the present disclosure, the box assembly comprises: a box body; and a power unit and a transmission for driving the box body to move between the first position and the second position; and the housing comprises one or more toothed bars to mesh with the transmission.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the description, relative terms such as "longitudinal", "transversal", "front", "rear", "right", "left", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation. Terms concerning attachments, coupling and the like, such as "connected" and "interconnected", refer to a relationship, in which structures are secured or attached to one another either directly or indirectly through intervening structures, as well as both movable or rigid attachments or relationships, unless expressly described otherwise.

Figure 1:
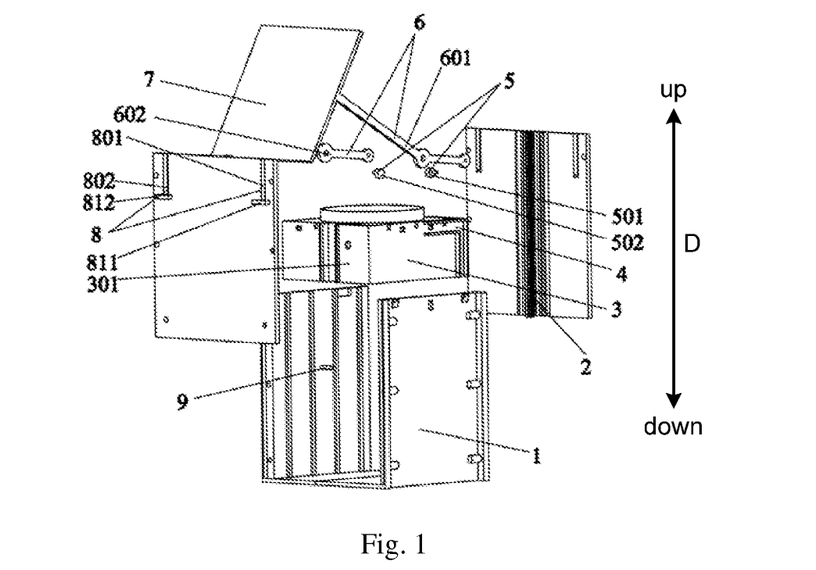
FIG. 1 illustrates a three-dimensional exploded view of a lifting device for vehicle-mounted equipment, according to an embodiment of the present disclosure.

FIG. 1 illustrates a three-dimensional exploded view of a lifting device for vehicle-mounted equipment according to embodiments of the present disclosure. Arrow D indicates an up and down direction. The lifting device comprises a housing 1 with an opening on the top, a cover-flipping mechanism 6, and a lifting-box assembly 3 onto which vehicle-mounted equipment (not shown) can be mounted. The vehicle-mounted equipment can include a vehicle-mounted robot, a driving reminder, or a vehicle-mounted GPS, etc. Housing 1 is adapted to be disposed in a dashboard (e.g. shown as dashboard 10 in FIG. 3), and includes an opening for the vehicle-mounted equipment passing through. A person with ordinary skill in the art will appreciate that while "vehicle-mounted equipment" is referred to here, the device can be used for other vehicle-mounted objects. Cover-flipping mechanism 6 is disposed to pivot within housing 1, and includes a first end coupled with a cover plate 7 for exposing or covering the opening of housing 1. Although a rectangular plate is shown in FIGS. 1-4, a person with ordinary skill in the art will appreciate that cover plate 7 can take on various shapes and can include curved surfaces, and should not be construed to be limited to a rectangular plate. Cover-flipping mechanism 6 also includes a second end coupled to lifting-box assembly 3. Lifting-box assembly 3 is also disposed in housing 1, and is configured to be vertically movable between a first position, where cover plate 7 covers the opening after the vehicle-mounted equipment retracts into the dashboard through the opening, and a second position, where cover plate 7 exposes the opening and the vehicle-mounted equipment can extend out of the dashboard through the opening.

With a lifting device according to embodiments of the present disclosure, the opening can be exposed by cover plate 7 to allow the vehicle-mounted equipment to extend out of the dashboard when needed, and the opening can be covered by cover plate 7 after the vehicle-mounted equipment retracts into the dashboard. Thus, the appearance integrality of the dashboard can be substantially maintained. Articles such as dust and water can also be prevented from entering into the dashboard. The inosculation of the vehicle-mounted equipment to the interior of vehicle can also be improved.

Figure 2:
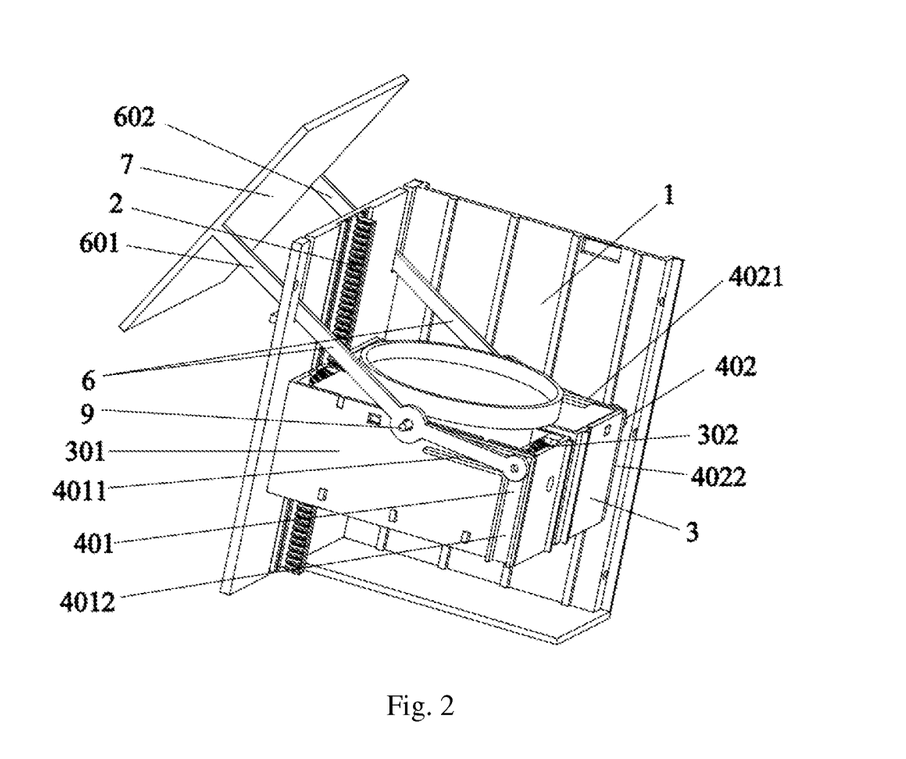
FIG. 2 illustrates a three-dimensional view of part of the lifting device illustrated in FIG. 1, according to an embodiment of the present disclosure.

FIG. 2 illustrates a three-dimensional view of part of the lifting-device illustrated in FIG. 1, according to an embodiment of the present disclosure. Lifting-box assembly 3 comprises a lifting-box body 301 and a power mechanism 302 disposed in lifting-box body 301 to move lifting-box assembly 3 between a first position (for example, away from the opening of housing 1) and a second position (for example, near the opening of housing 1). In some embodiments, power mechanism 302 comprises a power unit and a transmission mechanism coupled with the power unit. In some embodiments, each of a pair of opposing inner sidewalls of housing 1 can have a toothed bar 2, extended, for example, vertically along the inner sidewall, to mesh with the transmission mechanism, thus facilitating the movement, for example, ascending and descending along a vertical direction, of the lifting-box assembly 3.

Figure 5:
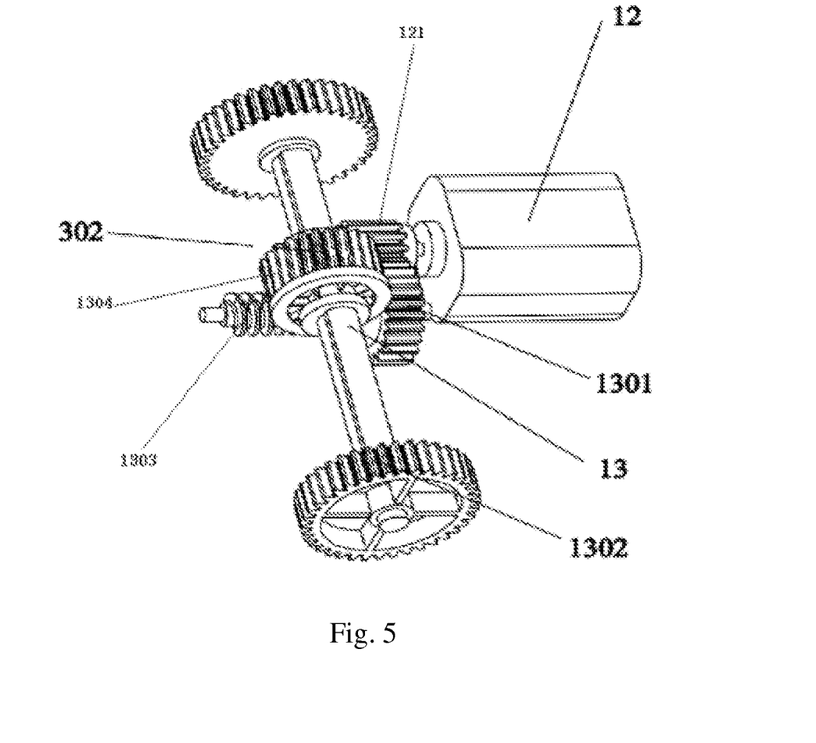
FIG. 5 illustrates a power mechanism for the lifting device illustrated in FIGS. 1 to 4, according to an embodiment of the present disclosure.

FIG. 5 illustrates a power mechanism for the lifting device illustrated in, for example, FIGS. 1 and 2, according to an embodiment of the present disclosure. The power mechanism illustrated in FIG. 5 can be an embodiment of power mechanism 302 in FIG. 1. The power mechanism includes a power unit 12. In some embodiments, power unit 12 can include a motor. As shown in FIG. 5, a gear 121 is coupled with an output shaft of power unit 12. In some embodiments, the power mechanism also includes a transmission mechanism 13, which comprises an input gear 1301, a worm 1303, an intermediate gear 1304 and an output gear 1302. In some embodiments, Input gear 1301 can mesh with motor gear 121. In some embodiments, worm 1303 is coaxial with input gear 1301. In some embodiments, intermediate gear 1304 can mesh with worm 1303. In some embodiments, output gear 1302 is coaxial with intermediate gear 1304 and can mesh with toothed bar 2 extended along the inner sidewall of housing 1 illustrated in FIGS. 1 and 2. The engagements between input gear 1301 and motor gear 121, and between output gear 1302 and toothed bar 2, allow power unit 12 to move lifting-box body 301 along, for example, a vertical direction within housing 1 illustrated in FIGS. 1 and 2.

Figure 3:
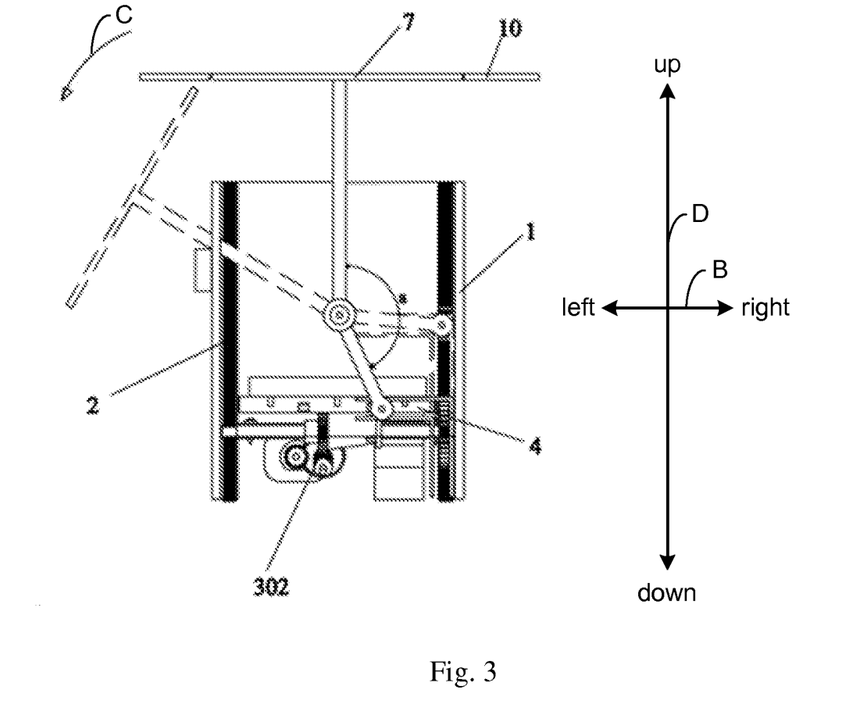
FIG. 3 illustrates a movement mechanism of the lifting device illustrated in FIGS. 1 and 2 relative to a dashboard, according to an embodiment of the present disclosure.
Figure 4:
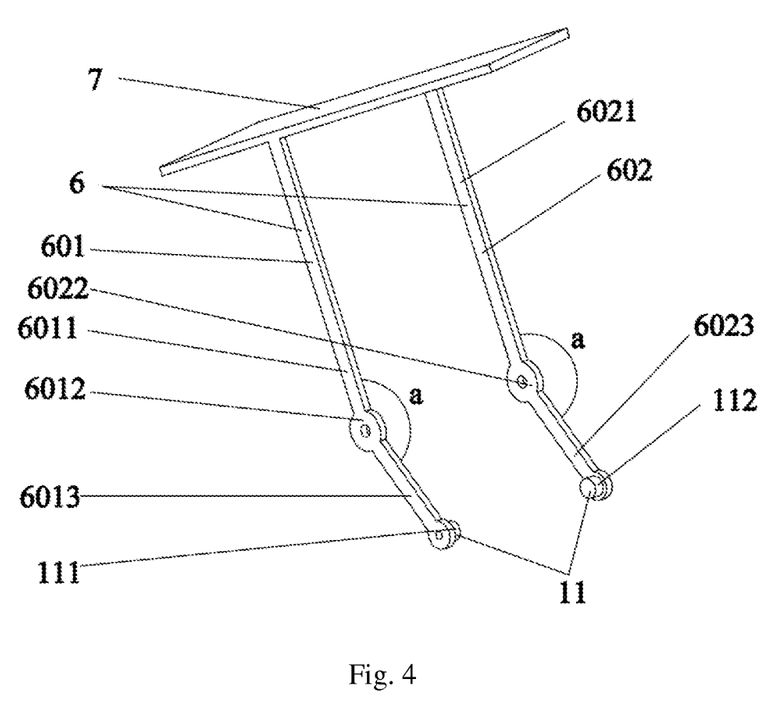
FIG. 4 illustrates a cover-flipping mechanism for the lifting device illustrated in FIGS. 1 to 3, according to an embodiment of the present disclosure.

FIG. 3 illustrates a movement mechanism of the lifting device illustrated in FIGS. 1 and 2, relative to dashboard 10, according to an embodiment of the present disclosure. The up and down direction is indicated by an arrow D, the left and right direction is indicated by an arrow B, while the anti-clockwise direction is indicated by an arrow C. As shown in FIG. 3, a sidewall of lifting-box body 301 of the lifting device illustrated in FIGS. 1 and 2, includes a guiding structure 4. Referring to FIG. 4, which illustrates a cover-flipping mechanism for the lifting device illustrated in FIGS. 1 to 3, according to an embodiment of the present disclosure. The cover-flipping mechanism illustrated in FIG. 4 can be one embodiment of cover-flipping mechanism 6 illustrated in FIGS. 1 and 2. The second end of cover-flipping mechanism 6 is coupled with a guiding column structure 11, which can slidably fit in guiding structure 4 of lifting-box body 301. Such an arrangement allows lifting-box assembly 3 to cause guiding column structure 11 to slide in the guiding structure 4 as the lifting-box assembly 3 ascends or descends. Guiding column structure 11, coupled to the second end of cover-flipping mechanism 6, can in turn cause cover-flipping mechanism 6 to pivot, which can then cause cover plate 7 to move from a first position (e.g. covering the opening of dashboard 10 and forming a surface integral to dashboard 10) to a second position (e.g. the position indicated by the dotted line, where an opening of dashboard 10 is exposed). As result, as lifting-box assembly 3, which can hold vehicle-mounted equipment, ascends or descends, the opening of housing 1 can be exposed or covered respectively by cover plate 7.

Referring back to FIGS. 2 and 3, in some embodiments, each of a pair of opposing inner sidewalls of housing 1 includes a rotating shaft 9. Cover-flipping mechanism 6 can be pivotably mounted onto rotating shaft 9. Referring to FIG. 4, cover-flipping mechanism 6 can further comprise a first rotating arm 601 and a second rotating arm 602, wherein each rotating arm is parallel to each other and can be pivotably mounted onto rotating shaft 9 respectively. In some embodiments, cover plate 7 is coupled to a first end of each of the first and second rotating arms 601 and 602.

As shown in FIG. 4, in some embodiments, first rotating arm 601 further comprises a first mounting ring 6012, a first rotating rod 6011, and a second rotating rod 6013. First and second rotating rods 6011 and 6013 are coupled together, forming an angle a between them, at first mounting ring 6012. In some embodiments, second rotating arm 602 further comprise a second mounting ring 6022, a third rotating rod 6021, and a fourth rotating rod 6023. Third and fourth rotating rods 6021 and 6023 are be coupled together, forming an angle a between them, at second mounting ring 6022. In some embodiments, first mounting ring 6012 and second mounting ring 6022 can be pivotably mounted onto each member of rotating shaft 9 respectively, thus allowing first rotating arm 601 and second rotating arm 602 to pivot about rotating shaft 9 respectively. In some preferred embodiments, the angle a is within a range between about 100 degrees and about 150 degrees.

In some embodiments, one side of cover plate 7 are coupled with a first end of first rotating rod 6011 away from first mounting ring 6012, and another side of cover plate 7 are coupled with a first end of third rotating rod 6021 away from second mounting ring 6022. A top surface of cover plate 7 can form a surface integral to the dashboard. Cover plate 7 can also cover or even substantially seal the opening of housing 1 to, for example, substantially conceal the retracted vehicle-mounted equipment held by lifting-box assembly 3.

In some embodiments of the present disclosure, as shown in FIG. 4, guiding column structure 11 further comprises a first sliding column 111 and a second sliding column 112 disposed, respectively, on second ends of first and second rotating arms 601 and 602. Referring back to FIG. 2, in some embodiments, guiding structure 4 further comprises a first guiding groove 401 and a second guiding groove 402 formed on a pair of opposite outer sidewalls (e.g. a front sidewall and a back sidewall) of lifting-box body 301 respectively. In some embodiments, first sliding column 111 can slidably fit in first guiding groove 401, and second sliding column 112 can slidably fit in second guiding groove 402. As the motion of guiding column structure 11 is guided by guiding structure 4, the guiding structure also affects the pivoting motion of cover-flipping mechanism 6. In some embodiments of the present disclosure, first guiding groove 401 further comprises a groove portion 4012 extended in a direction, such as a vertical direction, and a groove portion 4011 connected with and perpendicular to groove portion 4012. In some embodiments, second guiding groove 402 further comprises a groove portion 4022 extended in a direction, such as a vertical direction, and a groove portion 4021 connected with and perpendicular to groove portion 4022. For convenience, the following description will refer to groove portion 4011 as "first vertical groove portion 4011", groove portion 4012 as "first horizontal groove portion 4012", groove portion 4021 as "second vertical groove portion 4021" and groove portion 4022 as "second horizontal groove portion 4022," although a person with ordinary skill in the art will understand that the terms "horizontal" and "vertical" are used for convenience, that the terms "horizontal" and "vertical" are relative and should not be construed to reflect a particular orientation.

Referring to FIG. 3, in some embodiments, the ascending of the lifting-box assembly 3 comprises first and second ascending stages. In some embodiments, the descending of the lifting-box assembly 3 also comprises first and second descending stages. In some embodiments, during the first ascending stage, lifting-box assembly 3 moves upwardly from a first position (e.g. near the bottom of housing 1) towards a second position (e.g. near the top of housing 1), which may cause first and second sliding columns 111 and 112 to slide rightward in first horizontal groove portion 4011 and second horizontal groove portion 4021 respectively, until they reach the right ends of the horizontal groove portions which also meet with the upper ends of first and second vertical groove portions 4012 and 4022 respectively. At the same time, cover-flipping mechanism 6 can be driven to rotate in a direction, such as the anti-clockwise direction C indicated in FIG. 3. As result, cover plate 7 can move to a location indicated by the dotted lines, and the opening of housing 1, as well as the opening of dashboard 10, can be exposed. During the second ascending stage, lifting-box assembly 3 can move continuously upward while, at the same time, first and second sliding columns 111 and 112 slide downward in first vertical groove portion 4012 and second vertical groove portion 4022 respectively relative to the ascending lifting-box assembly 3. During the second ascending stage, the posture of cover-flipping mechanism 6, as well as the position of cover plate 7, can be substantially maintained. The second ascending stage ends with lifting-box assembly 3 reaching near the top of housing 1.

On the other hand, during the first descending stage, lifting-box assembly 3 descends from a second position (e.g. near the top of housing 1) towards to a first position (e.g. near the bottom of housing 1), which may cause first and second sliding columns 111 and 112 to slide upward, relative to the descending lifting-box assembly 3, in first and second vertical groove portions 4012 and 4022 towards the upper ends of the vertical groove portions, which also meet with the right ends of first and second horizontal groove portions 4011 and 4021 respectively. During the first descending stage, the posture of cover-flipping mechanism 6, as well as the position of cover plate 7, can be substantially maintained. During the second descending stage, as lifting-box assembly 3 continuously moves downward, at the same time, first and second sliding columns 111 and 112, after reaching the upper ends of the vertical groove portions, are guided to slide leftward in first horizontal groove portion 4011 and second horizontal groove portion 4021 respectively with driving cover-flipping mechanism 6 to rotate in a direction (e.g. in a clock-wise direction), which in turn causes cover plate 7 to cover the opening. Finally, as first and second sliding columns 111 and 112 reach the left ends of first horizontal groove portion 4011 and second horizontal groove portion 4021 respectively, lifting-box assembly 3 reaches a first position (e.g. near the bottom of housing 1) and cover plate 7 can substantially cover the opening.

As result, cover-flipping mechanism 6 is driven and guided by first horizontal groove portion 4011 and second horizontal groove portion 4021 during the ascending and descending of lifting-box assembly 3.

In some embodiments, as shown in FIG. 1, housing 1 further comprises a position limit structure 8 disposed on an upper edge of a sidewall of the housing. In some embodiments, position limit structure 8 comprises first and second position limit grooves 801 and 802, each extend in a direction, for example downwardly, from a top surface of the sidewall of the housing respectively. In some embodiments, position limit structure 8 further comprises a first position limit block 811 disposed on a sidewall of the housing at a bottom end of first position limit groove 801, and a second limit block 812 disposed on a side wall of the housing at a bottom end of second position limit groove 802. First rotating arm 601 and second rotating arm 602 can be adapted to slidably fit within first and second limit grooves 801 and 802 respectively so that the movement of both rotating arms can be limited.

In some embodiments, first rotating rod 6011 of first rotating arm 601 can move along, for example, a vertical direction within first position limit grooves 801 until first rotating rod 6011 reaches an end (e.g. bottom end) of first position limit grooves 801, thus limiting the movement of first rotating rod 6011. In some embodiments, first position limit block 811 can increase the contact area between first rotating rod 6011 and position limit structure 8 when first rotating rod 6011 moves to the bottom of first position limit grooves 801. Such an arrangement can further limit the motion of first rotating rod 6011.

In some embodiments, third rotating rod 6021 of second rotating arm 602 can move along, for example, a vertical direction within second position limit groove 802 until third rotating rod 6021 reaches an end (e.g. bottom end) of second position limit groove 802, thus limiting the movement of third rotating rod 6021. Furthermore, second limit block 812 can increase the contact area between third rotating rod 6021 and position limit structure 8 when third rotating rod 6021 moves to the bottom of second position limit groove 802. Such an arrangement can further limit the motion of third rotating rod 6021.

The operation of the lifting device according to embodiments of the present disclosure will be described in detail with reference to FIGS. 1 to 4.

When it is desired to use and extend the vehicle-mounted equipment out of dashboard 10 through the opening of housing 1, lifting-box assembly 3 can move, for example, upwards along a vertical direction, from a first position (e.g. near bottom of housing 1), via the engagement between power mechanism 302 disposed in lifting-box body 301 and toothed bar 2. At around the same time, first and second sliding columns 111 and 112, disposed on two sides of the cover-flipping mechanism 6, can slide respectively in the first horizontal groove portion 4011 and the second horizontal groove portion 4021, towards the upper ends of first vertical groove portion 4012 and second vertical groove portion 4022 in, for example, a right direction. Cover-flipping mechanism 6 can then pivot and turn cover plate 7. Finally, the opening of dashboard 10 can be exposed as lifting-box assembly 3 reaches a second position (e.g. near top of housing 1). The vehicle-mounted equipment posited in or on the lifting-box assembly 3 can then extend out of dashboard 10 through the opening.

When the vehicle-mounted equipment are not used and it is desired to retract the vehicle-mounted equipment into dashboard 10 through the opening, lifting-box assembly 3 can move, for example, downward along a vertical direction, via the engagement between power mechanism 302 in lifting-box body 301 and toothed bar 2. At around the same time, first and second sliding columns 111 and 112, disposed on two sides of cover-flipping mechanism 6, can first slide upward, relative to the descending lifting-box body 301, in first vertical groove portion 4012 and the second vertical groove portion 4022 respectively. During that time the posture of cover-flipping mechanism 6 and the position of cover plate 7 can be substantially maintained. Next, first and second sliding columns 111 and 112 can slide leftwards in first horizontal groove portion 4011 and second horizontal groove portion 4021 respectively, and cover-flipping mechanism 6 can pivot to turn cover plate 7. Finally, as lifting-box assembly 3 reaches a first position (e.g. near the bottom of housing 1), the opening of dashboard 10 can be substantially covered. Therefore, the opening of dashboard 10 can be exposed or covered according to the ascending and descending of lifting-box assembly 3. Accordingly, the opening of dashboard 10 can be covered after a piece of vehicle-mounted equipment retracts into dashboard 10, thus substantially protecting the appearance integrality of dashboard 10 and preventing articles, such as dust and water, from entering into the dashboard.

Although a cover-flipping mechanism is disclosed various embodiments of the present disclosure, a person with ordinary skill in the art will appreciate that there are other mechanisms to cause the cover to move in response to the movement of the lifting device. Besides, although in various embodiments of the present disclosure, "lifting-device" has been referenced to throughout, a person with ordinary skill in the art will appreciate that the mechanisms disclosed are equally applicable for devices operating in different orientations.

A vehicle according to some embodiments of the present disclosure comprises: a lifting device for one or more vehicle-mounted equipment described with reference to the above embodiments; and one or more vehicle-mounted equipment disposed on the lifting-box assembly 3 of the lifting device. With a vehicle according to the embodiments of the present disclosure, the vehicle-mounted equipment can extend out of the dashboard or retract into the dashboard, thus substantially protecting the appearance integrality of the dashboard and preventing articles, such as dust and water, from entering into the dashboard.

Although throughout the description, various embodiments of this disclosure have been described to be installed in a vehicle's dashboard, or to be used for vehicle-mount equipment, it would be appreciated by those skilled in the art that the embodiments of this disclosure can be used as a standalone device and need not be installed in a vehicle dashboard. It would also be appreciated by those skilled in the art that the embodiments of this disclosure can be used for other devices, or not used for other devices at all, and that the functionality exhibited by the embodiments of this disclosure can be independent from the application of the embodiments.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A device for moving one or more vehicle-mounted objects, comprising:
    a housing with an opening;
    a cover;
    at least one pivot for adjusting the cover, the at least one pivot disposed in the housing and comprises a first end and a second end, wherein the first end is coupled with the cover; and
    a box assembly disposed in the housing and being movable between a first position away from the opening and a second position near the opening, the box assembly being coupled with the second end of the at least one pivot, wherein the cover exposes at least a part of the opening when the box assembly is at the second position, and covers at least a part of the opening when the box assembly is at the first position, and wherein the at least one pivot is pivotably mounted within the housing.

2. The device according to claim 1, wherein the box assembly comprises:
    a box body; and
    a power unit and a transmission for driving the box body to move between the first position and the second position;
    and wherein the housing comprises one or more toothed bars to mesh with the transmission.

3. The device according to claim 2, wherein the power unit comprises:
    a motor; and
    an output shaft coupled with a first gear;
    and wherein the transmission comprises:
        a second gear to mesh with the first gear;
        a worm coaxial with the second gear;
        a third gear to mesh with the worm; and
        a fourth gear coaxial with the third gear and to mesh with the one or more toothed bars.

4. The device according to claim 2, wherein at least one sidewall of the box body comprises a guiding structure;
    and wherein the second end of the at least one pivot is coupled with a guiding column structure, wherein the guiding column structure is capable of slidably fitting in the guiding structure, and wherein the box assembly is configured to cause the at least one pivot to rotate via a motion of the guiding column structure within the guiding structure.

5. The device according to claim 4, wherein at least one sidewall of the housing comprises a rotating shaft to mount the at least one pivot on the housing.

6. The device according to claim 5, wherein the at least one pivot further comprises at least one rotating arm to be pivotably mounted on the rotating shaft, and the cover is coupled with a first end of the at least one rotating arm.

7. The device according to claim 6, wherein the at least one rotating arm comprises:
    a first mounting ring;
    a first rotating rod; and
    a second rotating rod,
    wherein the first and second rotating rods are coupled together at the first mounting ring and form an angle between them.

8. The device according to claim 7, wherein the angle ranges from about 100degrees to about 150 degrees.

9. The device according to claim 8, wherein a surface of the cover is coupled to one end of the first rotating rod of the at least one rotating arm away from the first mounting ring.

10. The device according to claim 8, wherein the guiding column structure comprises at least one sliding column disposed on one end of the second rotating rod of the at least one rotating arm away from the first mounting ring.

11. The device according to claim 10, wherein the guiding structure comprises at least one guiding groove, and wherein the at least one sliding column is capable of slidably fitting in the at least one guiding groove.

12. The device according to claim 11, wherein the at least one guiding groove comprises:
    a first groove portion; and
    a second groove portion connected with and is perpendicular to the first groove portion.

13. The device according to claim 6, wherein the housing further comprises a position limit structure disposed on an edge of the at least one sidewall of the housing, wherein the position limit structure comprises:
    at least one position limit groove which starts from the edge of the sidewall and cuts through at least a part of the sidewall, wherein the at least one rotating arm is capable of slidably fitting within the at least one position limit groove; and at least one first position limit block disposed at one end of the at least one position limit groove.

14. A vehicle, comprising:
a dashboard with an opening; and
a device for moving one or more vehicle-mounted objects, comprising:
   a housing;
   a cover;
   at least one pivot disposed in the housing and comprises a first end and a second end, wherein the first end is coupled with the cover; and
   a box assembly disposed in the housing and being movable between a first position away from the opening and a second position near the opening, the box assembly being coupled with the second end of the at least one pivot, wherein the cover exposes at least a part of the opening when the box assembly is at the second position, and covers at least a part of the opening when the box assembly is at the first position.

15. The vehicle of claim 14, wherein the cover forms a surface integral to the dashboard when the box assembly is at the first position.

16. The vehicle of claim 14, wherein the box assembly comprises:
   a box body; and
   a power unit and a transmission for driving the box body to move between the first position and the second position;
   and wherein the housing comprises one or more toothed bars to mesh with the transmission.

17. The vehicle of claim 16, wherein at least one sidewall of the box body comprises a guiding structure; and wherein the second end of the at least one pivot is coupled with a guiding column structure, wherein the guiding column structure is capable of slidably fitting in the guiding structure, and wherein the box assembly is configured to cause the at least one pivot to rotate via a motion of the guiding column structure within the guiding structure.

18. A vehicle, comprising:
a dashboard with an opening; and
a device for moving one or more vehicle-mounted objects, comprising:
   a housing;
   a cover;
   at least one pivot for moving the cover, the at least one pivot disposed in the housing and is configured to cause the cover to move; and
   a box assembly disposed in the housing and being movable between a first position away from the opening and a second position near the opening, the box assembly being coupled with the at least one pivot, wherein the cover exposes at least a part of the opening when the box assembly is at the second position, and covers at least a part of the opening when the box assembly is at the first position.

19. The vehicle of claim 18, wherein the cover forms a surface integral to the dashboard when the box assembly is at the first position.

20. The vehicle of claim 18, wherein the box assembly comprises:
   a box body; and
   a power unit and a transmission for driving the box body to move between the first position and the second position;
   and wherein the housing comprises one or more toothed bars to mesh with the transmission.

* * * * *